(12) United States Patent
Yabuuchi

(10) Patent No.: US 9,203,997 B2
(45) Date of Patent: Dec. 1, 2015

(54) IMAGE PROCESSING APPARATUS AND IMAGE PROCESSING METHOD

(71) Applicant: KYOCERA Document Solutions Inc., Osaka-shi, Osaka (JP)

(72) Inventor: Yasuyuki Yabuuchi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/576,042

(22) Filed: Dec. 18, 2014

(65) Prior Publication Data

US 2015/0181064 A1 Jun. 25, 2015

(30) Foreign Application Priority Data

Dec. 20, 2013 (JP) ................................. 2013-263385

(51) Int. Cl.
*H04N 1/04* (2006.01)
*H04N 1/00* (2006.01)
*H04N 1/23* (2006.01)
*H04N 1/38* (2006.01)

(52) U.S. Cl.
CPC ....... *H04N 1/00803* (2013.01); *H04N 1/00588* (2013.01); *H04N 1/00713* (2013.01); *H04N 1/233* (2013.01); *H04N 1/38* (2013.01); *H04N 2201/0081* (2013.01); *H04N 2201/0094* (2013.01)

(58) Field of Classification Search
CPC ..... G06F 17/211; G06F 17/24; G06F 3/1205; G06F 3/1243; G06F 3/1253; G06F 3/1257; G06F 3/1285; H04N 1/00803; H04N 1/203; H04N 1/32363; H04N 1/38; H04N 1/46; H04N 2201/3288; H04N 2201/3295

USPC .............. 358/505, 474, 1.18, 1.15, 462, 1.12, 358/1.13, 1.16, 1.6, 1.9, 2.1, 401, 448, 498, 358/515, 524; 382/312, 165, 254, 317; 399/362; 715/205, 206, 207, 208, 255, 715/820; 702/83
See application file for complete search history.

(56) References Cited

U.S. PATENT DOCUMENTS

| | | | | |
|---|---|---|---|---|
| 4,763,167 | A * | 8/1988 | Watanabe et al. | 347/155 |
| 5,805,970 | A * | 9/1998 | Kasamatsu | 399/376 |
| 5,877,864 | A * | 3/1999 | Sumida et al. | 358/1.16 |
| 6,873,427 | B1 * | 3/2005 | Matsuda et al. | 358/1.15 |
| 7,364,155 | B2 * | 4/2008 | Nagao et al. | 271/186 |

(Continued)

FOREIGN PATENT DOCUMENTS

JP 10229484 A 8/1998

*Primary Examiner* — Negussie Worku
(74) *Attorney, Agent, or Firm* — Alleman Hall McCoy Russell & Tuttle LLP

(57) ABSTRACT

In response to a reading start instruction, a second size detection processing portion detects a predetermined maximum sheet size for which reading can be performed by an image reading portion, among sheet sizes having the same size in a main scanning direction as that of a document sheet indicated by an output signal from a document sheet width sensor. A first blank sheet determination processing portion sets a first determination region corresponding to the sheet size, and a control portion causes the image reading portion to perform a reading operation. If image information of the first determination region is obtained, the first blank sheet determination processing portion determines whether a document sheet image is a blank sheet image, based on the image information. If the document sheet image is a blank sheet image, a first image processing portion deletes image information of the document sheet image.

3 Claims, 6 Drawing Sheets

(56) References Cited

U.S. PATENT DOCUMENTS

| | | | |
|---|---|---|---|
| 7,420,717 B2* | 9/2008 | Park | 358/474 |
| 7,929,186 B2* | 4/2011 | Kubota et al. | 358/474 |
| 8,259,316 B2* | 9/2012 | Yanagawase | 358/1.13 |
| 2009/0080033 A1* | 3/2009 | Arai | 358/462 |
| 2009/0227436 A1* | 9/2009 | Takahashi | 493/420 |
| 2010/0271645 A1* | 10/2010 | Nakabayashi | 358/1.9 |
| 2011/0222943 A1* | 9/2011 | Tanaka | 399/391 |
| 2012/0081766 A1* | 4/2012 | Mori | 358/505 |

* cited by examiner

IMAGE PROCESSING APPARATUS AND IMAGE PROCESSING METHOD

INCORPORATION BY REFERENCE

This application is based upon and claims the benefit of priority from the corresponding Japanese Patent Application No. 2013-263385 filed on Dec. 20, 2013, the entire contents of which are incorporated herein by reference.

BACKGROUND

The present disclosure relates to an image processing apparatus and an image processing method having a function of performing blank sheet determination as to whether an input image is a blank sheet image.

Conventionally, an image processing apparatus has been proposed which has a blank sheet determination function of determining whether an image of a read document sheet is a blank sheet image, and deleting the image when the image is determined as a blank sheet image.

SUMMARY

An image processing apparatus according to one aspect of the present disclosure includes a document sheet conveyance portion, an image reading portion, a mixed size reading control portion, a first size detection portion, a first blank sheet determination processing portion, and a first image processing portion. The document sheet conveyance portion is configured to sequentially convey a plurality of document sheets placed on a document sheet placement portion. The image reading portion is configured to read image information from each document sheet conveyed by the document sheet conveyance portion. The mixed size reading control portion is configured to perform mixed size reading processing of causing the image reading portion to read image information corresponding to a length in a secondary scanning direction of a predetermined maximum sheet size, from each document sheet placed on the document sheet placement portion. The first size detection portion is configured to detect a size of the document sheet based on the image information from the document sheet conveyed by the document sheet conveyance portion read by the image reading portion. The first blank sheet determination processing portion is configured to, in the case where the mixed size reading processing is executed by the mixed size reading control portion, determine whether the document sheet image is a blank sheet image, based on image information of a first determination region previously set according to a document sheet with the maximum sheet size, before the size of the document sheet is detected by the first size detection portion. The first image processing portion is configured to, if the first blank sheet determination processing portion determines that the document sheet image is a blank sheet image, delete image information of the document sheet image.

An image processing method according to another aspect of the present disclosure includes a first step, a second step, a third step, a fourth step, a fifth step, and a sixth step. In the first step, a plurality of document sheets placed on a document sheet placement portion are sequentially conveyed by a document sheet conveyance portion. In the second step, it is performed to cause the image reading portion to read image information from the document sheet conveyed by the document sheet conveyance portion. In the third step, mixed size reading processing is performed to cause the image reading portion to read image information corresponding to a length in a secondary scanning direction of a predetermined maximum sheet size, from each document sheet conveyed by the document sheet conveyance portion. In the fourth step, a size of the document sheet is detected based on the image information read by the image reading portion. In the fifth step, in the case where the mixed size reading processing in the third step is executed, whether the document sheet image is a blank sheet image is determined based on image information of a first determination region previously set according to a document sheet with the maximum sheet size, before the size of the document sheet is detected in the fourth step. In the sixth step of, if it is determined in the fifth step that the document sheet image is a blank sheet image, image information of the document sheet image is deleted.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. It is noted that embodiments described below are merely examples in which the present disclosure is embodied, and do not limit the technical scope of the present disclosure.

Figure 1:
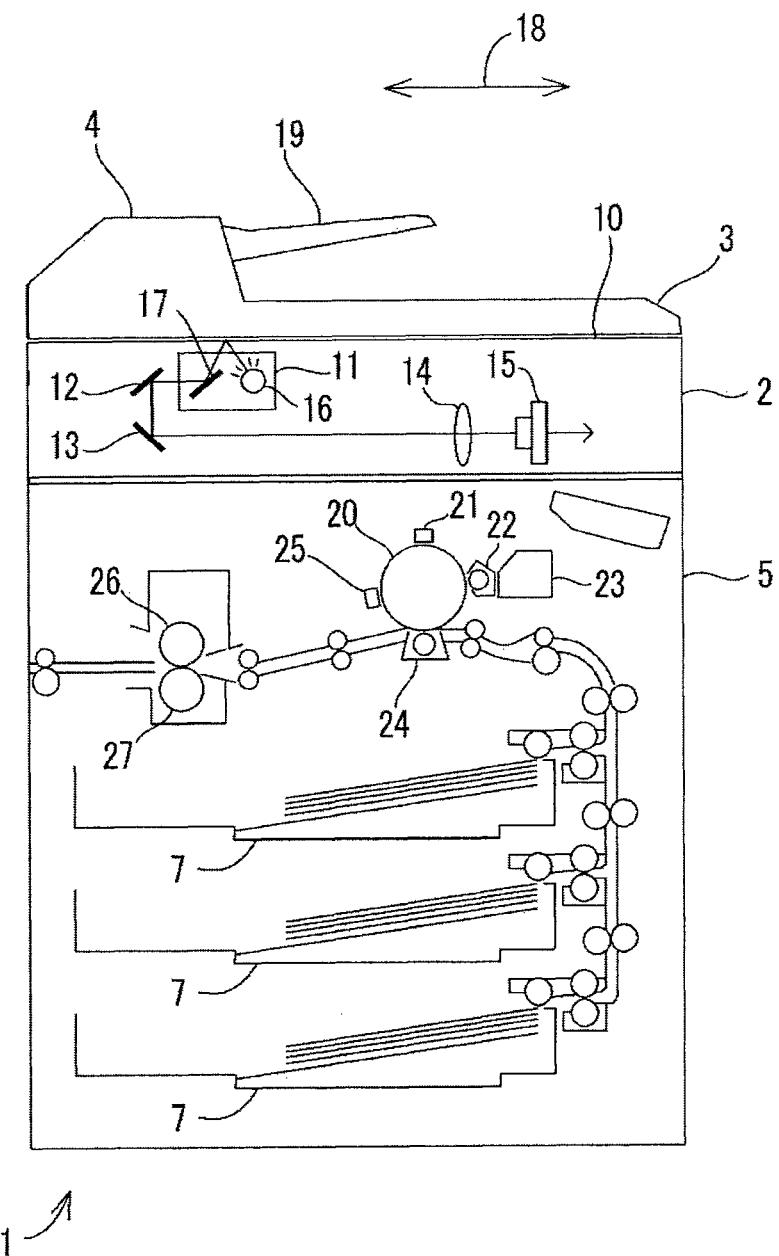
FIG. 1 is a schematic diagram showing the configuration of an image processing apparatus according to an embodiment of the present disclosure.

First, a schematic configuration of an image processing apparatus 1 according to an embodiment of the present disclosure will be described with reference to FIGS. 1 and 2. The image processing apparatus 1 is a multifunction peripheral having an image reading function, a facsimile function, an image forming function, and the like. As shown in FIG. 1, the image processing apparatus 1 includes an image reading portion 2, a document sheet cover 3, an auto document feeder (hereinafter, referred to as an ADF) 4, an image forming portion 5, an operation display portion 6 (see FIG. 2), sheet feed cassettes 7, a communication interface portion (communication I/F portion) 8 (see FIG. 2), and a control portion 9 (see FIG. 2) for controlling these components. Here, the image processing apparatus 1 that is a multifunction peripheral will be described as an example of the image processing apparatus of the present disclosure. However, the present disclosure is not limited thereto. For example, a printer, a facsimile device, a copy machine, or a scanner device also corresponds to the image processing apparatus of the present disclosure.

The image reading portion 2 executes image reading processing to read image data from a document sheet. As shown in FIG. 1, the image reading portion 2 includes a contact glass 10, a reading unit 11, a mirror 12, a mirror 13, an optical lens 14, a CCD (Charge Coupled Device) 15, and the like.

The reading unit 11 includes an LED light source 16 and a mirror 17. The reading unit 11 is movable in a secondary scanning direction 18 (a right-left direction in FIG. 1) by a moving mechanism (not shown) using a driving motor such as a stepping motor. As the reading unit 11 is moved in the secondary scanning direction 18 by the driving motor, light radiated from the LED light source 16 toward the contact glass 10 disposed on a top surface of the image reading portion 2 scans in the secondary scanning direction 18.

When light is radiated from the LED light source 16, the mirror 17 reflects, toward the mirror 12, light reflected by a document sheet or a reverse surface of the document sheet cover 3. The light reflected by the mirror 17 is guided to the optical lens 14 through the mirrors 12 and 13. The optical lens 14 focuses the incident light onto the CCD 15.

The CCD 15 is a photoelectric converter that converts the received light to an electric signal (voltage) according to an amount of the received light (intensity of brightness), and outputs the electric signal to the control portion 9. The control portion 9 generates image information of the document sheet by performing image processing for the electric signal from the CCD 15. In the present embodiment, an example where the CCD 15 is used as an imaging device is described. However, instead of the reading mechanism using the CCD 15, a reading mechanism using a contact image sensor (CIS) having a focal length shorter than that of the CCD 15 may be applied.

The document sheet cover 3 is pivotably mounted on the image reading portion 2. By the document sheet cover 3 being operated to pivot, the contact glass 10 on the top surface of the image reading portion 2 is opened or closed. In a pivoting support portion of the document sheet cover 3, a cover-opening detection sensor (not shown) such as a limit switch is provided. When a user opens the document sheet cover 3 to read an image of a document sheet, the cover-opening detection sensor is actuated to output a detection signal (cover-opening detection signal) to the control portion 9.

Here, reading of document sheet image by the image reading portion 2 is performed through the following procedure. First, a document sheet is placed on the contact glass 10, and then the document sheet cover 3 is brought into a closed position. Thereafter, when an image reading instruction is inputted from the operation display portion 6, one line of light is sequentially applied continuously from the LED light source 16 while the reading unit 11 is being moved rightward in the secondary scanning direction 18. Then, light reflected by the document sheet or the reverse surface of the document sheet cover 3 is guided to the CCD 15 through the mirrors 17, 12 and 13 and the optical lens 14, and light amount data based on the amount of light received by the CCD 15 is sequentially outputted to the control portion 9. When the light amount data for the entirety of the region to which the light has been radiated is obtained, the control portion 9 processes the light amount data to generate image information of the document sheet based on the light amount data. The image information is image information constituting a rectangular image.

The ADF 4 is provided in the document sheet cover 3. The ADF 4 is an example of a document sheet conveyance portion. The ADF 4 has a document set portion 19 (an example of a document sheet placement portion) on which a document sheet is placed. The ADF 4 sequentially conveys one or more document sheets set on the document sheet set portion 19, by means of a plurality of conveying rollers, and moves the document sheets rightward in the secondary scanning direction 18 through an automatic document sheet reading position defined on the contact glass 10. When the document sheet is moved by the ADF 4, the reading unit 11 is positioned below the automatic document sheet reading position, and an image of the document sheet being moved is read by the reading unit 11 at this position.

In addition, the ADF 4 includes a pair of document sheet guides for restraining movement of a document sheet in a document sheet width direction perpendicular to the document sheet conveyance direction. The pair of document sheet guides are disposed so as to oppose each other in the document sheet width direction. The pair of document sheet guides are slidable in opposite directions so that they can approach to each other or separate from each other. The image processing apparatus 1 includes a document sheet width sensor 49 (see FIG. 2) that detects the width of the document sheet (the size in the main scanning direction of the document sheet) according to the amount of slide of the pair of document sheet guides. The image processing apparatus 1 can detect the size in the main scanning direction of the document sheet, based on an output signal from the document sheet width sensor 49. As described later, the size in the secondary scanning direction of a document sheet is detected based on image information outputted by the image reading portion 2.

As shown in FIG. 1, the image forming portion 5 performs image formation by an electrophotographic method. The image forming portion 5 executes image forming processing (printing processing) based on image information read by the image reading portion 2 or on a printing job inputted from an external information processing apparatus such as a personal computer through the communication I/F portion 8. Specifically, the image forming portion 5 includes a photosensitive drum 20, a charging portion 21, a developing portion 22, a toner container 23, a transfer roller 24, an electricity removing portion 25, a fixing roller 26, a pressure roller 27, and the like. In the present embodiment, the image forming portion 5 of an electrophotographic type will be described as an example. However, the image forming portion 5 is not limited to an electrophotographic type, but may be an ink jet recording type, or may be other recording types or printing types.

In the image forming portion 5, image forming processing for a print sheet fed from the sheet feed cassette 7 is performed by the following procedure. First, when a printing job including a printing instruction is inputted through the communication I/F portion 8, the charging portion 21 uniformly charges the photosensitive drum 20 at a predetermined potential. Next, light based on image data included in the printing job is radiated to the surface of the photosensitive drum 20 by a laser scanning unit. Thus, an electrostatic latent image is formed on the surface of the photosensitive drum 20. The electrostatic latent image on the photosensitive drum 20 is developed (visualized) as a toner image by the developing portion 22. It is noted that toner (developer) is supplied from the toner container 23 to the developing portion 22. Subsequently, the toner image formed on the photosensitive drum 20 is transferred onto the print sheet by the transfer roller 24. Thereafter, when the print sheet passes between the fixing roller 26 and the pressure roller 27 and is discharged, the toner image transferred onto the print sheet is heated by the fixing roller 26, to be fused and fixed. The potential of the photosensitive drum 20 is removed by the electricity removing portion 25.

The communication I/F portion 8 is an interface that executes data communication with an external device connected to the image processing apparatus 1 via a communication network such as the Internet or a LAN.

Figure 3A:
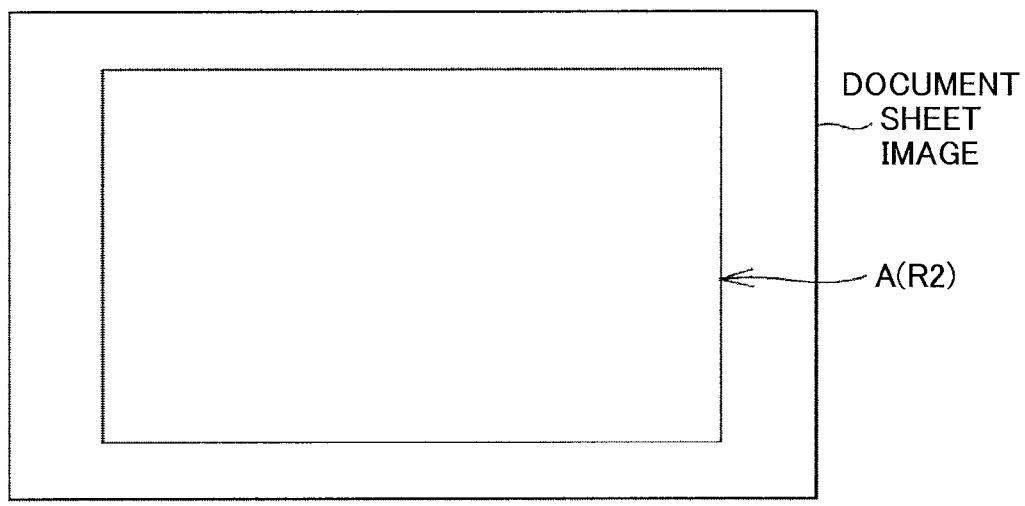
FIG. 3A and FIG. 3B are diagrams showing second determination regions previously set for respective document sheets with different sizes.
Figure 3B:
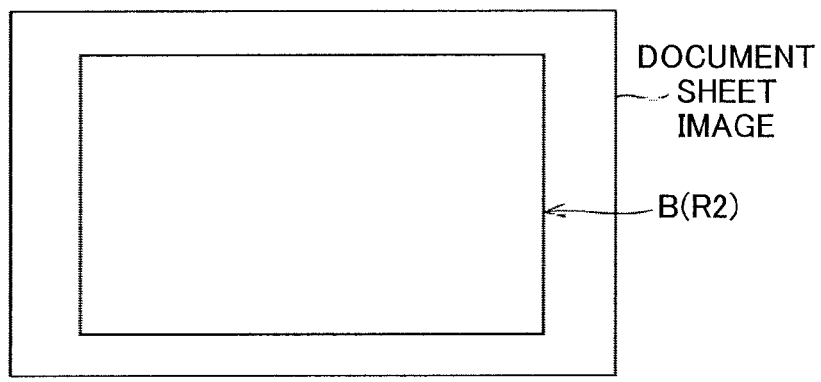

A storage portion 28 is composed of a nonvolatile memory such as a hard disc drive (HDD). The storage portion 28 has a region information storage portion 281 which stores region information of a determination region used in blank sheet determination processing described later. The determination region is set in accordance with a sheet size. For example, as shown in FIG. 3A, for a document sheet with A4 size, a region indicated by an arrow A is set as a determination region, and as shown in FIG. 3B, for a document sheet with B5 size, a region indicated by an arrow B is set as a determination region. In the region information storage portion 281, region information of determination regions corresponding to respective sheet sizes is previously stored.

The control portion 9 includes a CPU (Central Processing Unit), a ROM (Read Only Memory), and a RAM (Random Access Memory). The CPU is a processor that executes various kinds of operational processing. The ROM is a nonvolatile storage portion in which information such as a control program for causing the CPU to execute the various kinds of processing is previously stored. The RAM is a volatile storage portion used as a temporary storage area (working area) to be used in the various kinds of processing executed by the CPU. The CPU executes a program stored in the ROM, whereby the control portion 9 controls operation of the image processing apparatus 1.

In addition, in the ROM of the control portion 9, an image processing program for causing the CPU of the control portion 9 to execute image processing (see a flowchart in FIG. 6) described later is previously stored. The image processing program may be stored in a non-transitory computer-readable storage medium such as a CD, a DVD, or a flash memory, and may be installed from the storage medium into a storage device such as the EEPROM of the control portion 9 or a hard disk (not shown). The present disclosure may be understood as a method of executing process steps of the image processing in the image processing apparatus 1, an image processing program for causing the control portion 9 to execute the process steps of the image processing, or a non-transitory computer-readable storage medium having stored therein the image processing program.

The operation display portion 6 includes a display portion 29 and an operation portion 30. The display portion 29 includes, for example, a color liquid crystal display, and displays various kinds of information to a user who operates the operation display portion 6. The operation portion 30 includes various push button keys disposed adjacent to the display portion 29, a touch panel sensor disposed on a display screen of the display portion 29, and the like. Various kinds of instructions are inputted to the operation portion 30 by a user of the image processing apparatus 1. When a user performs an operation on the operation display portion 6 in order to execute at least one of an image reading operation and an image forming operation, the corresponding operation signal is outputted from the operation display portion 6 to the control portion 9.

The image processing apparatus 1 according to the present embodiment has a mixed size reading mode in which, when a bundle of document sheets including document sheets with different sizes are placed on the ADF 4, an image of each document sheet of the bundle of document sheets is read. The operation display portion 6 has a mixed size reading mode setting operation portion 31 for setting the image processing apparatus 1 to the mixed size reading mode.

In addition, the image processing apparatus 1 of the present embodiment has a blank sheet determination function of, when reading an image of a document sheet, determining whether each page (each read surface) is a page with a drawn image or a blank page with no drawn image. The blank sheet determination function is particularly effective in the case of reading images of a plurality of document sheets stacked in a bundle (a bundle of document sheets), which are placed on the document sheet set portion 19 of the ADF 4. That is, a document sheet with no drawn image may be included in the bundle of document sheets, or a one-side-blank sheet may be included in the bundle of document sheets. In such a case, the blank sheet determination function detects the page with no drawn image, and image information of a document sheet image 101 of this page is deleted (discarded). Thus, there is an advantage that unnecessary processing can be omitted.

In the case where a reading instruction for a bundle of document sheets including document sheets with different sizes is inputted, any document sheet of the bundle of document sheets may include a blank page (with no drawn image). In such a case, in order to delete image information of a document sheet image 101 (blank sheet image) of such a page by the blank sheet determination function, as shown in FIG. 3A and FIG. 3B, it is conceivable to perform blank sheet determination for each read surface by using determination regions previously set according to respective read surface sizes (document sheet sizes).

Here, in the case where the size of a read surface is detected based on an image obtained by a reading operation for a document sheet, it is necessary to complete the reading operation for the document sheet in order to perform blank sheet determination as described above. Thus, if blank sheet determination for the read surface cannot be performed until the reading operation for the read surface is completed, it takes long time to complete reading of all document sheets. On the other hand, as described later, the image processing apparatus 1 according to the present embodiment can reduce image processing time in the case where blank sheet determination is performed for each document sheet of the bundle of document sheets including document sheets with different sizes.

Figure 2:
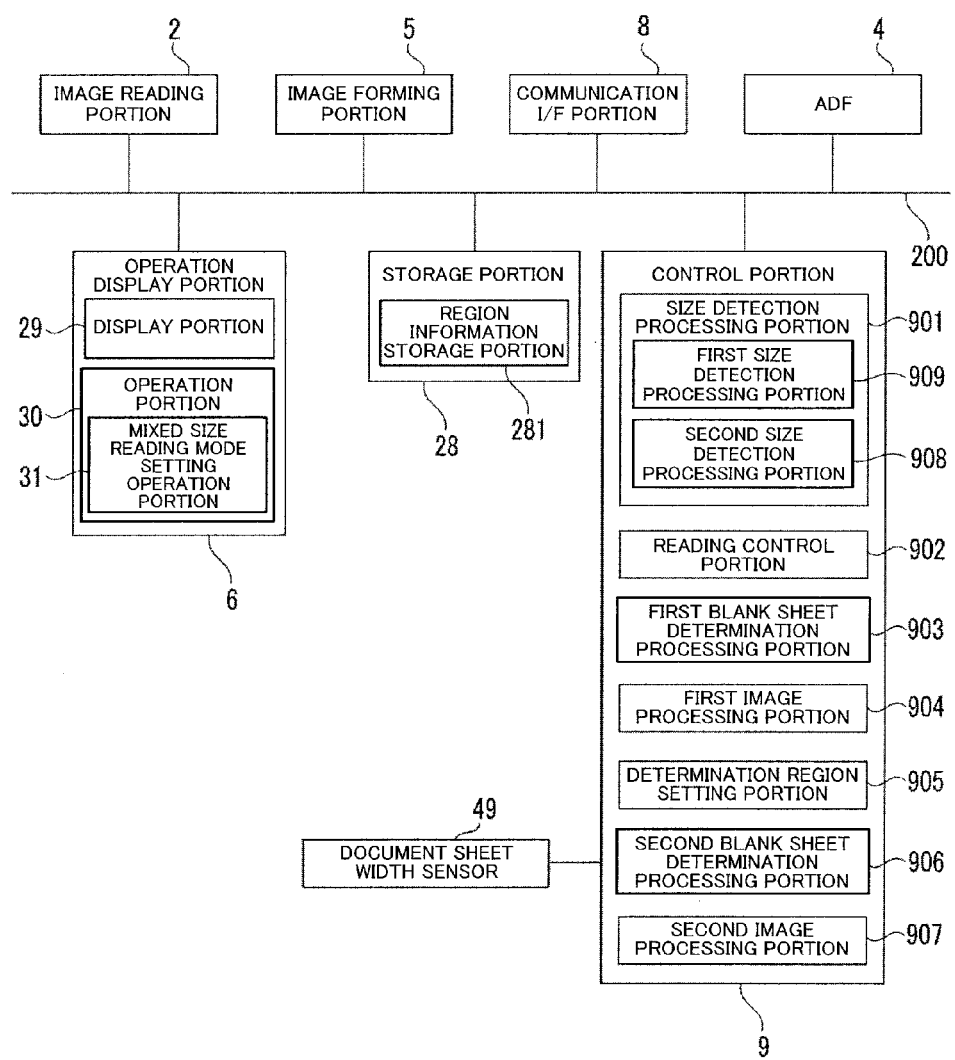
FIG. 2 is a block diagram showing an example of the electric configuration of the image processing apparatus according to the embodiment of the present disclosure.

As shown in FIG. 2, the control portion 9, by executing a program with the CPU, functions as a size detection processing portion 901, a reading control portion 902, a first blank sheet determination processing portion 903, a first image processing portion 904, a determination region setting portion 905, a second blank sheet determination processing portion 906, and a second image processing portion 907. In another embodiment, part or a plurality of the functions of the control portion 9 may be implemented as electronic circuits. Here, the reading control portion 902 is an example of a mixed size reading control portion of the present disclosure.

Figure 4A:
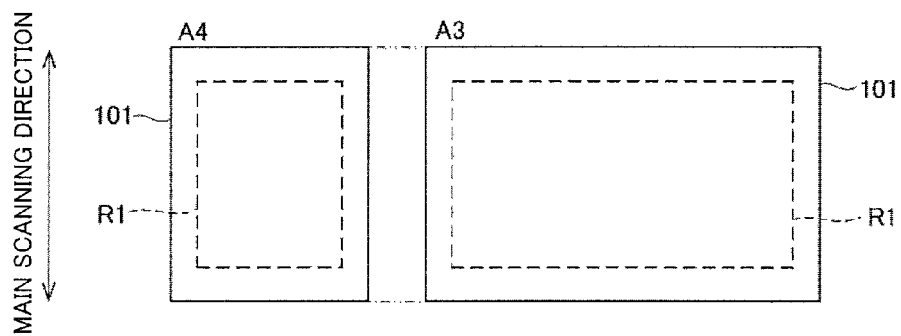
FIG. 4A and FIG. 4B are explanation diagrams about sizes of document sheets.
Figure 4B:
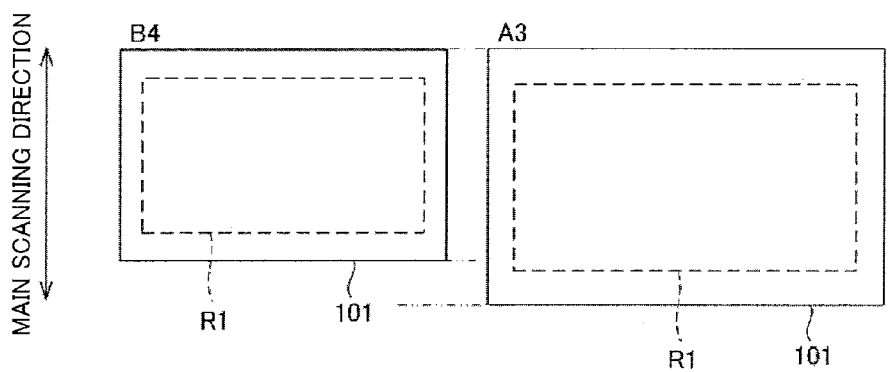

The size detection processing portion 901 has a first size detection processing portion 909 and a second size detection processing portion 908. The second size detection processing portion 908 detects the size in the main scanning direction of a document sheet, based on an output signal from the document sheet width sensor 49. In addition, the second size detection processing portion 908 detects a predetermined maximum sheet size for which reading can be performed by the image reading portion 2, among sheet sizes having the same size in the main scanning direction as that of the document sheet detected by the second size detection processing portion 908. For example, as shown in FIG. 4A, the length of a long side of a document sheet with A4 size is the same as the length of a short side of a document sheet with A3 size. In the case where an output signal from the document sheet width sensor 49 indicates this length, the second size detection processing portion 908 detects A3 size as the predetermined maximum sheet size. On the other hand, as shown in FIG. 4B, any of the side lengths of a document sheet with B4 size and a document sheet with A3 size are not equal to each other. In this case, an output signal from the document sheet width sensor 49 indicates A3 size. At this time, the second size detection processing portion 908 detects A3 size as the predetermined maximum sheet size. That is, when document sheets having different lengths in the main scanning direction are set on the ADF 4, the second size detection processing portion 908 specifies, as the maximum sheet size, the size of a document sheet having the largest length in the main scanning direction among the set document sheets. A result of the detection by the second size detection processing portion 908 is used for determining a determination region R1 (first determination region R1) which is employed at an initial stage of blank sheet determination processing performed for a bundle of document sheets.

The first size detection processing portion 909 detects the sizes in the main scanning direction and the secondary scanning direction of a document sheet, based on image information outputted from the image reading portion 2. The first size detection processing portion 909 detects a rear end in the conveyance direction of a document sheet, based on image information outputted from the image reading portion 2, thereby detecting the sizes in the main scanning direction and the secondary scanning direction of the document sheet. Since the detection processing by the first size detection processing portion 909 is performed based on image information outputted from the image reading portion 2, the detection processing is performed after the image information is obtained from the image reading portion 2. The size detection processing portion 901 detects a document sheet size, based on a result of the detection by the first size detection processing portion 909.

The document sheet width sensor 49 and the second size detection processing portion 908 are an example of a second size detection portion. The image reading portion 2 and the first size detection processing portion 909 are an example of a first size detection portion.

The reading control portion 902 controls operation of the CCD 15. That is, the reading control portion 902 selects a pixel to be caused to output a pixel signal based on a vertical scanning signal and a horizontal synchronizing signal, and causes this pixel to output a pixel signal. In the present embodiment, in the case where the mixed size reading mode is set, the reading control portion 902 causes the CCD 15 to perform a reading operation of reading, from each of document sheets placed on the ADF 4 and conveyed by the ADF 4, image information corresponding to the length in the secondary scanning direction of the maximum sheet size detected by the second size detection processing portion 908. That is, in the case where the length of a short side of A3 size is detected as a length in the main scanning direction by the second size detection processing portion 908, even if the bundle of document sheets includes a document sheet with A4 size, the reading control portion 902 performs a reading operation corresponding to A3 size, for all the documents.

The first blank sheet determination processing portion 903 reads, from the storage portion 28, region information of a determination region (first determination region R1) corresponding to the maximum sheet size. Then, when the first blank sheet determination processing portion 903 receives image information of the first determination region R1 of a document sheet image 101 corresponding to the maximum sheet size from the reading control portion 902, the first blank sheet determination processing portion 903 determines whether the document sheet image 101 is a blank sheet image, based on the image information. Among pixels corresponding to the first determination region R1, the first blank sheet determination processing portion 903 counts the number of pixels having a density previously set for determining that a pixel is not a white pixel (with no image drawn), and determines whether the counted number exceeds a predetermined threshold value. If the counted number exceeds the predetermined threshold value, the first blank sheet determination processing portion 903 determines that the image of the first determination region R1 is not a blank sheet image, and determines that the document sheet image 101 is not a blank sheet image.

Figure 5A:
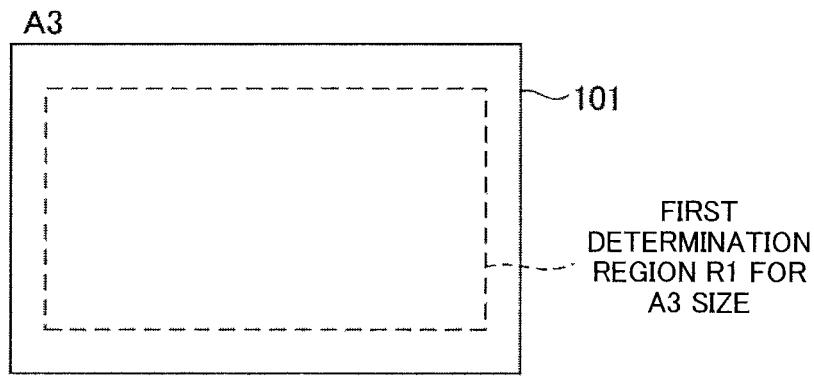
FIG. 5A, FIG. 5B, and FIG. 5C are diagrams showing a first determination region protruding out of a document sheet.
Figure 5B:
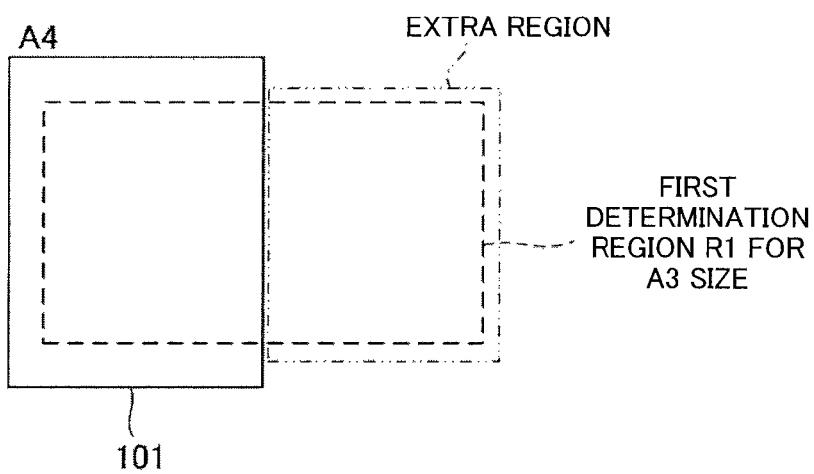
Figure 5C:
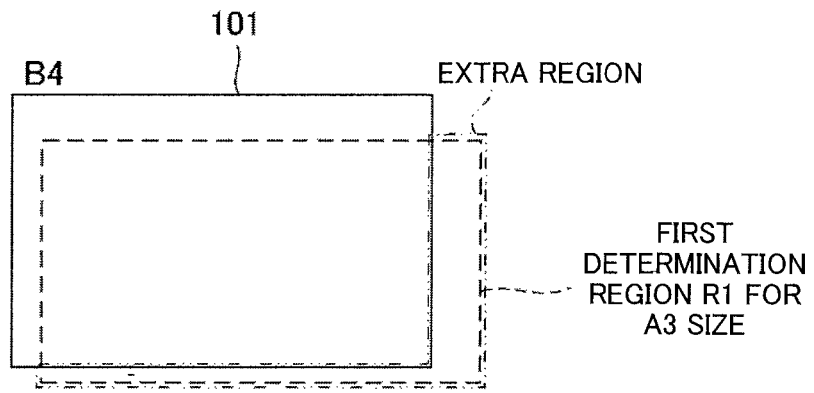

Here, in the present embodiment, as shown in FIG. 5A, blank sheet determination processing is performed using a determination region (first determination region R1) for the maximum sheet size (here, A3 size). Therefore, as shown in FIGS. 5B and 5C, in the case where the sheet size of an actual document sheet is smaller than the maximum sheet size, an extra region other than an image region of the document sheet is included in the first determination region R1. Image information obtained from this extra region becomes noise in blank sheet determination. If blank sheet determination is performed based on an image including such noise, there is a possibility that the blank sheet determination is not appropriately performed. In such a situation, the image in the first determination region R1 includes an edge image of the document sheet. Therefore, in the case where the edge image is detected, although it is unknown whether the document sheet image 101 is a blank sheet image, since the second blank sheet determination processing portion 906 performs blank sheet determination processing later, the first blank sheet determination processing portion 903 provisionally determines that the document sheet image 101 is not a blank sheet image. On the other hand, if the counted number is equal to or smaller than the predetermined threshold value, the first blank sheet determination processing portion 903 determines that the image of the first determination region R1 is a blank sheet image, and determines that the document sheet image 101 is a blank sheet image.

If the first blank sheet determination processing portion 903 determines that the document sheet image 101 is a blank sheet image, the first image processing portion 904 performs processing of deleting image information of the document sheet image 101. Thus, generation of a blank printed matter can be prevented.

If the first blank sheet determination processing portion 903 determines that the document sheet image 101 is a blank sheet image, the reading control portion 902 ends the reading operation for the document sheet whose image is being read. Thus, a reading operation for the next document sheet can be performed immediately.

If the first blank sheet determination processing portion 903 determines that the document sheet image 101 is not a blank sheet image, the size detection processing portion 901 detects the document sheet size, and then the determination region setting portion 905 sets a determination region R2 (second determination region R2) corresponding to the document sheet size. That is, when the size detection processing portion 901 detects the document sheet size, the determination region setting portion 905 reads region information of a determination region R2 (second determination region R2) corresponding to the document sheet size, from the storage portion 28. For example, if the size detection processing portion 901 detects that the document sheet size is A4 size, the determination region setting portion 905 reads region information of a region indicated by an arrow A in FIG. 3A, from the storage portion 28. Then, the determination region setting portion 905 sets the second determination region R2 for the document sheet image 101, based on the above region information. The region stored in the storage portion 28 is, for example, information indicating a region obtained by reducing the outer shape of a document sheet having the corresponding size toward the center so that the vertical length becomes, for example, 80(%) and the horizontal length becomes, for example, 70(%), or information indicating a rectangular region obtained by excluding a belt-like region having a width of, for example, 30 mm along top, bottom, right, and left sides from a document sheet having the corresponding size.

The second blank sheet determination processing portion 906 extracts image information corresponding to the second determination region R2 set by the determination region setting portion 905, from image information of the document sheet image 101. Then, the second blank sheet determination processing portion 906 determines whether the image of the second determination region R2 is a blank sheet image, based on the extracted image information, thereby determining whether the document sheet image 101 is a blank sheet image. Thus, for the document sheet image 101 determined to not be a blank sheet by the first blank sheet determination processing portion 903, blank sheet determination processing is performed based on image information of the image of the second determination region R2 corresponding to the document sheet size, whereby blank sheet determination can be appropriately performed irrespective of the sizes of document sheets. A processing method of the blank sheet determination processing by the second blank sheet determination processing portion 906 is the same as that by the first blank sheet determination processing portion 903, so the description thereof is omitted.

If the second blank sheet determination processing portion 906 determines that the document sheet image 101 is a blank sheet image, the second image processing portion 907 deletes image information of the document sheet image 101. Thus, generation of a blank printed matter can be prevented.

If the second blank sheet determination processing portion 906 determines that the document sheet image 101 is not a blank sheet image, the control portion 9 causes the image forming portion 5 to perform an image forming operation (printing operation) based on the document sheet image 101.

Figure 6:
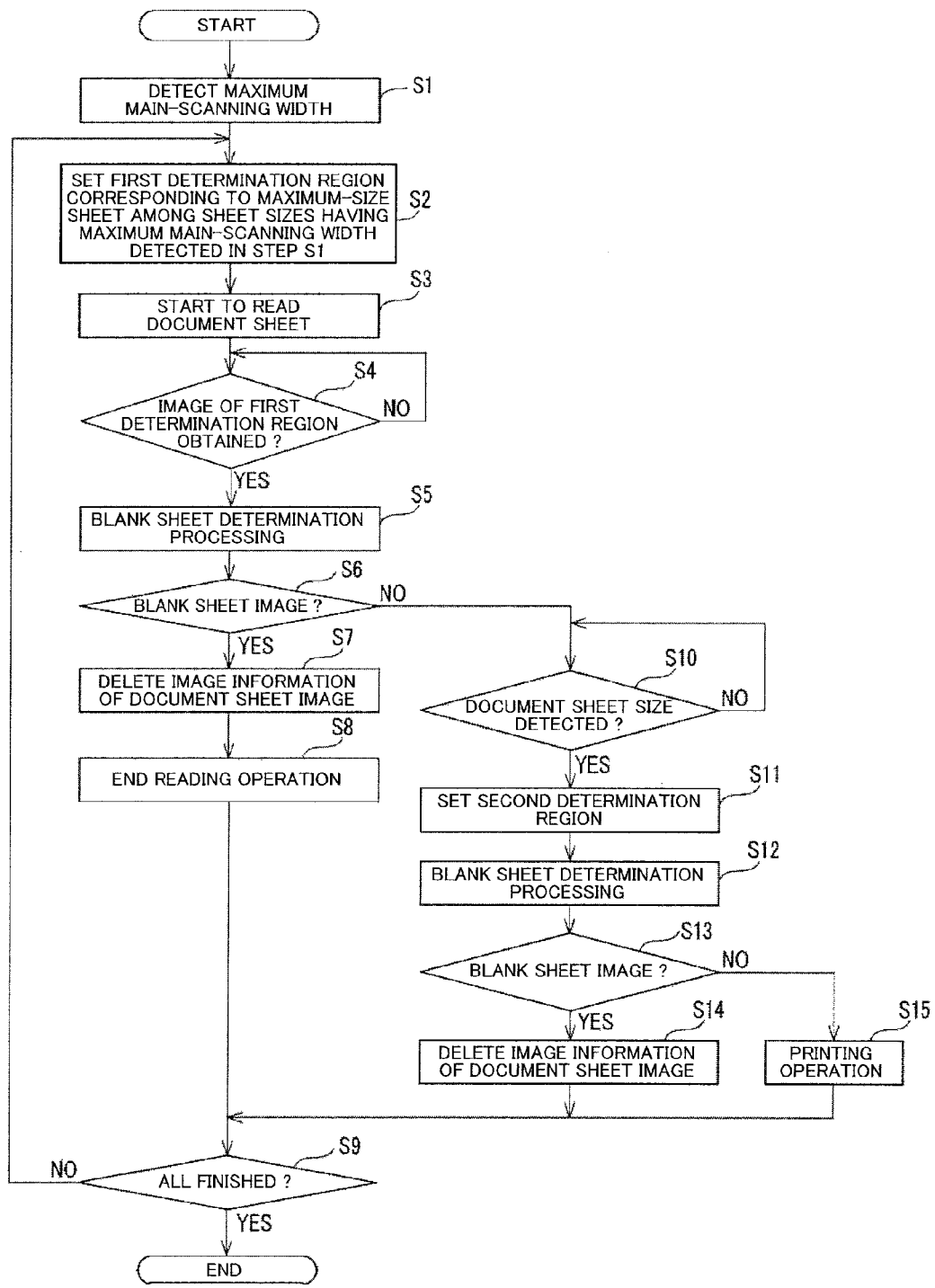
FIG. 6 is a flowchart showing a flow of process steps including blank sheet determination processing by a control portion in a mixed size reading mode.

Next, with reference to FIG. 6, a flow of a series of process steps including the blank sheet determination processing by the control portion 9 in the mixed size reading mode will be described. For execution of this process, the mixed size reading mode is set, and this process is started when document sheets are set on the document set portion 19 and a reading start instruction is inputted. In the flowchart in FIG. 6, S1, S2, ... denote numbers of steps in the process.

When the reading start instruction is inputted, the second size detection processing portion 908 detects the size in the main scanning direction of a document sheet based on an output signal from the document sheet width sensor 49, and detects a predetermined maximum sheet size for which reading can be performed by the image reading portion 2, among sheet sizes having the same size in the main scanning direction as the detected size (step S1).

The first blank sheet determination processing portion 903 reads region information of a determination region corresponding to the maximum sheet size, from the storage portion 28, and sets the determination region as the first determination region R1 (step S2). Then, the control portion 9 causes the image reading portion 2 to perform a reading operation (step S3).

Next, the first blank sheet determination processing portion 903 determines whether image information of the first determination region R1 has been obtained from the reading control portion 902 (step S4). If the image information has not been obtained yet (NO in step S4), the first blank sheet determination processing portion 903 stands by. If the image information has been obtained (YES in step S4), the first blank sheet determination processing portion 903 determines whether the document sheet image 101 is a blank sheet image, based on the image information (step S5).

If the first blank sheet determination processing portion 903 determines that the document sheet image 101 is a blank sheet image (YES in step S6), the first image processing portion 904 performs processing of deleting the image information of the document sheet image 101 (step S7). In addition, the reading control portion 902 ends the reading operation for the document sheet whose image is being read (step S8). Thus, a reading operation for the next document sheet can be performed immediately. Then, the control portion 9 determines whether the series of process steps has been completed for all the document sheets (step S9). If the control portion 9 determines that the series of process steps has not been completed yet (NO in step S9), the process returns to step S2. On the other hand, if the control portion 9 determines that the series of process steps has been completed (YES in step S9), the series of process steps for the bundle of document sheets is ended.

If the first blank sheet determination processing portion 903 determines that the document sheet image 101 is not a blank sheet image (NO in step S6), the determination region setting portion 905 determines whether the size of the document sheet has been detected by the size detection processing portion 901 (step S10). If the size of the document sheet has not been detected by the size detection processing portion 901 and the determination region setting portion 905 has not received the size information from the size detection processing portion 901 (NO in step S10), the determination region setting portion 905 stands by. On the other hand, if the size of the document sheet has been detected by the size detection processing portion 901 and the determination region setting portion 905 has received the size information from the size detection processing portion 901 (YES in step S10), the determination region setting portion 905 reads region information of a determination region corresponding to the detected size, from the storage portion 28, and sets the determination region as the second determination region R2 (step S11).

The second blank sheet determination processing portion 906 extracts image information corresponding to the second determination region R2 set by the determination region setting portion 905, from the image information of the document sheet image 101. Then, the second blank sheet determination processing portion 906 determines whether an image of the second determination region R2 is a blank sheet image, based on the extracted image information, thereby determining whether the document sheet image 101 is a blank sheet image (step S12). Thus, irrespective of the sizes of document sheets set on the ADF 4, blank sheet determination can be appropriately performed for each document sheet.

If the second blank sheet determination processing portion 906 determines that the document sheet image 101 is a blank sheet image (YES in step S13), the first image processing portion 904 performs processing of deleting the image information of the document sheet image 101 (step S14). On the other hand, if the second blank sheet determination processing portion 906 determines that the document sheet image 101 is not a blank sheet image (NO in step S13), the control portion 9 causes the image forming portion 5 to perform a printing operation (image forming operation) based on the image information of the document sheet image 101 (step S15). In the case where the reading operation executed by the image processing apparatus 1 is image reading processing such as network scan processing or facsimile processing, the image information of the document sheet image 101 is transmitted to a predetermined information processing apparatus via a network, or transmitted to a predetermined facsimile device.

As described above, the image processing apparatus 1 according to the present embodiment, in the mixed size reading mode, performs blank sheet determination processing to determine whether a document sheet image 101 is a blank sheet image, based on image information of a first determination region R1 previously set according to a document sheet with the maximum sheet size. Then, if it is determined that the document sheet image 101 is a blank sheet image, image information of the document sheet image 101 is deleted.

Thus, if an actual reading target is a document sheet with the same size as the maximum sheet size, a document sheet image 101 of a blank sheet can be detected before the document sheet size is detected based on image information of the document sheet image. Thus, if the document sheet image 101 is a blank sheet image, image information of the document sheet image 101 can be deleted at an earlier timing than in the case where blank sheet determination processing is performed after the size of the document sheet is detected. Owing to this, blank sheet determination processing for a document sheet image of the next document sheet can be started earlier. As a result, time taken until the image processing by the image processing apparatus 1 is completed can be shortened.

In addition, when the size in the main scanning direction of document sheets set on the ADF 4 is detected, a first determination region R1 corresponding to a document sheet with the maximum sheet size for which reading can be performed by the image reading portion 2 among sheet sizes having the same size in the main scanning direction as the detected size is selected as a determination region to be used for initial blank sheet determination processing. Then, in the case where it is determined based on image information of the first determination region R1 that a document sheet image 101 is not a blank sheet image, and therefore blank sheet determination processing is to be performed based on region information of a second determination region R2 corresponding to the size of the document sheet, the second determination region R2 is selected from among a plurality of determination regions corresponding to plural types of sheets having the same size in the main scanning direction. That is, a search range for searching for the second determination region R2 is not all the determination regions but is limited to some of the determination regions. Thus, region information of the second determination region R2 corresponding to the size of the document sheet can be retrieved immediately.

In the above embodiment, the size in the main scanning direction of document sheets is detected based on an output signal from the document sheet width sensor 49, and then a predetermined maximum sheet size for which reading can be performed by the image reading portion 2 among sheet sizes having the same size in the main scanning direction as the detected size is detected. However, in the present disclosure, the size in the main scanning direction for which the image reading portion 2 is caused to perform reading is not limited to the size detected based on an output signal from the document sheet width sensor 49, but may be a size in the main scanning direction of a document sheet with the maximum sheet size for which reading can be performed by the image processing apparatus 1 (image reading portion 2). For example, in the case where a document sheet with A3 size is previously registered in the image processing apparatus 1 as a document sheet with the maximum sheet size for which reading can be performed by the image processing apparatus 1 (image reading portion 2), the size in the main scanning direction of the document sheet with A3 size may be set as the size in the main scanning direction for which the image reading portion 2 is caused to perform reading.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. An image processing apparatus comprising:
a document sheet conveyance portion configured to sequentially convey a plurality of document sheets placed on a document sheet placement portion;
an image reading portion configured to read image information from each document sheet conveyed by the document sheet conveyance portion;
a second size detection portion configured to detect a size in a main scanning direction of a document sheet placed on the document sheet placement portion, before a mixed size reading processing is started, and detect a predetermined maximum sheet size for which reading can be performed by the image reading portion among sheet sizes having the same size in the main scanning direction as that of the document sheet detected by the second size detection portion;
a mixed size reading control portion configured to perform the mixed size reading processing of causing the image reading portion to read image information corresponding to a length in a secondary scanning direction of the predetermined maximum sheet size detected by the second size detection portion;
a first size detection portion configured to detect a size of the document sheet based on the image information from the document sheet conveyed by the document sheet conveyance portion read by the image reading portion;
a first blank sheet determination processing portion configured to, in the case where the mixed size reading processing is executed by the mixed size reading control portion, determine whether the document sheet image is a blank sheet image, based on image information of a first determination region previously set according to a document sheet with the maximum sheet size detected by the second size detection portion, before the size of the document sheet is detected by the first size detection portion;
a first image processing portion configured to, if the first blank sheet determination processing portion determines that the document sheet image is a blank sheet image, delete image information of the document sheet image;
a determination region setting portion configured to, if the first blank sheet determination processing portion determines that the document sheet image is not a blank sheet image, set a second determination region according to the size of the document sheet detected by the first size detection portion;

a second blank sheet determination processing portion configured to determine again whether the document sheet image is a blank sheet image, based on image information of the second determination region set by the determination region setting portion; and
   a second image processing portion configured to, if the second blank sheet determination processing portion determines that the document sheet image is a blank sheet image, delete image information of the document sheet image.

2. The image processing apparatus according to claim 1, wherein a size in the main scanning direction for which the image reading portion is caused to perform reading in the mixed size reading processing is a size in the main scanning direction of a document sheet with a maximum sheet size for which reading can be performed by the image reading portion.

3. The image processing apparatus according to claim 1, wherein, if the first blank sheet determination processing portion determines that the document sheet image is a blank sheet image, the mixed size reading control portion ends reading of image information from the document sheet corresponding to the document sheet image by the image reading portion.

* * * * *